United States Patent [19]

Okumura et al.

[11] Patent Number: 4,692,650
[45] Date of Patent: Sep. 8, 1987

[54] VIBRATION WAVE MOTOR

[75] Inventors: Ichiro Okumura, Yokohama; Takayuki Tsukimoto, Fujisawa; Takuo Okuno; Kazuhiro Izukawa, both of Yokohama; Hiroyuki Seki, Sagamihara; Hitoshi Mukohjima, Yokohama; Naoya Kaneda, Yokohama; Akira Hiramatsu, Yokohama, all of Japan

[73] Assignee: Canon Kabushiki Kaisha, Tokyo, Japan

[21] Appl. No.: 843,624

[22] Filed: Mar. 25, 1986

[30] Foreign Application Priority Data

Mar. 29, 1985 [JP] Japan .................................. 60-065457

[51] Int. Cl.⁴ ......................................... H01L 41/08
[52] U.S. Cl. ..................................... 310/323; 310/328
[58] Field of Search ................................ 310/328, 323

[56] References Cited

U.S. PATENT DOCUMENTS 4,453,103 6/1984 Vishnevsky et al. ........... 310/328 X
4,495,432 1/1985 Katsuma et al. ..................... 310/328

FOREIGN PATENT DOCUMENTS 0658684 4/1979 U.S.S.R. .............................. 310/328

Primary Examiner—Mark O. Budd
Attorney, Agent, or Firm—Fitzpatrick, Cella, Harper & Scinto

[57] ABSTRACT

A vibration wave motor is driven at a high efficiency by arranging a contact area of a movable member which contacts a vibration member such that a displacement locus in the contact area is essentially coincident with a vibration locus in the vibration member.

10 Claims, 9 Drawing Figures

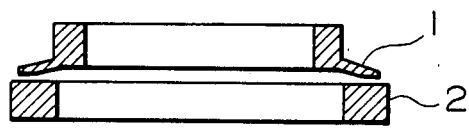
F I G. IA
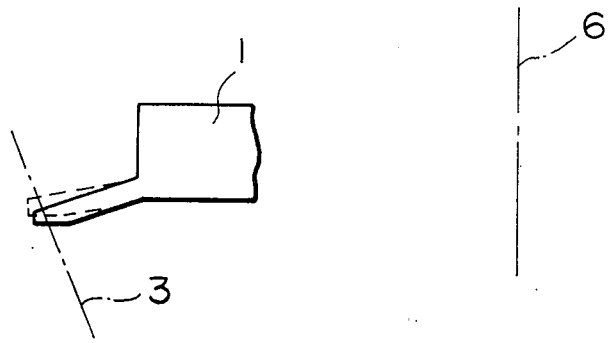
F I G. IB
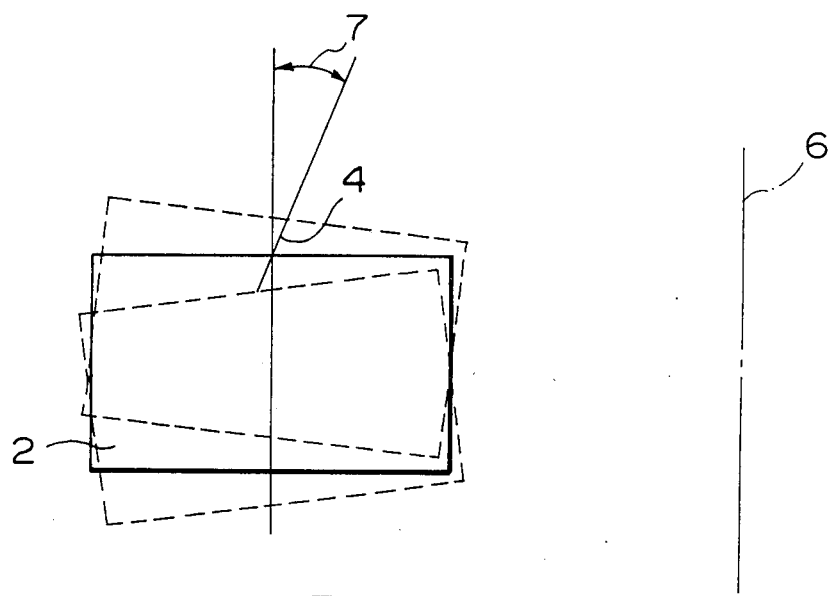
F I G. 2

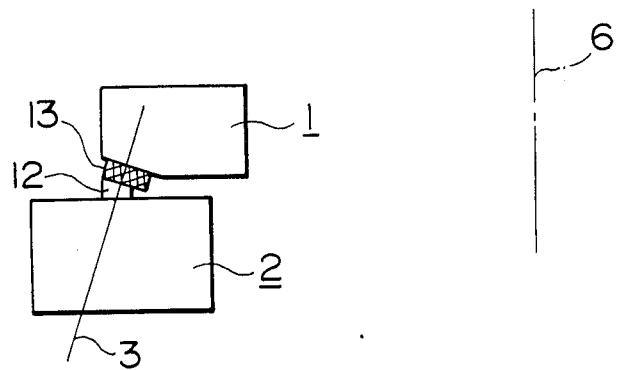
F I G. 4
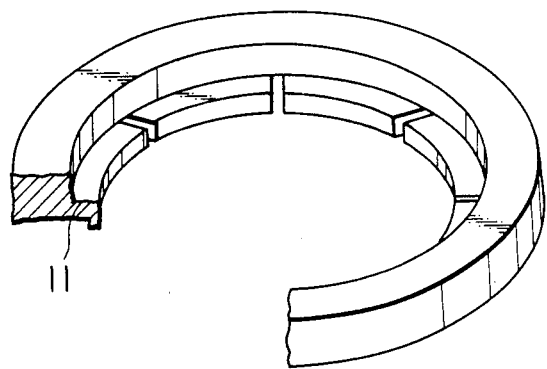
F I G. 5

VIBRATION WAVE MOTOR

BACKGROUND OF THE INVENTION

1. Field of the Invention

The present invention relates to a vibration wave motor, and more particularly to the structure of a member which frictionally contacts a vibration member of the vibration wave motor.

2. Related Background Art

A vibration wave motor disclosed in U.S. Pat. No. 4,513,219 has an electro-mechanical energy, such as an electrostrictive element, arranged on a vibration member. A periodic voltage is applied to the element to develop a travelling vibration wave, and the vibration member is press-contacted to a movable member to move the movable member by the vibration wave. In such a vibration wave motor, if a torque transmission efficiency between the vibration member of the motor and the member which frictionally contacts the vibration member is not sufficiently high, the energy efficiency of the vibration wave motor is lowered.

Several methods for improving the torque transmission characteristic between the vibration member and the member which frictionally contacts the vibration member have been proposed. One of the reasons why the torque transmission efficiency is not sufficiently high is that the vibration member and the contact surface of the member which frictionally contacts the vibration member are not sufficiently parallel and an apex of the vibration generated in the vibration member does not uniformly contact the member when viewed microscopically and hence the torque is not well transmitted. As an approach to resolve the above problem, Japanese Unexamined Patent Publication No. 188381/1984 discloses a method in which the member which frictionally contacts the vibration member is supported by an elastic member, such as rubber, so that the member is movable with a certain freedom and the vibration generated in the vibration member is transmitted efficiently to the member.

Japanese Patent Application Laid-open No. 272358/1984 (assigned to the assignee of the present application) discloses a method in which a rotor which contacts the vibration member is of a flange shape having a flange inclined outwardly of a center of rotation and good contact between the vibration member and the rotor is maintained by elastic deformation of the flange.

A rotated flange type ring-shaped rotor is shown in FIGS. 1A and 1B.

FIG. 1A shows a sectional view of the flange type rotor and FIG. 1B is an enlarged sectional view of the flange shown in FIG. 1A. Numeral 1 denotes the flange type rotor having the flange, and numeral 2 denotes a vibration member for frictionally driving the rotor 1. The rotor 1 is frictionally driven by longitudinal vibration generated in the vibration member 2 and the flange of the rotor 1 is elastically deformed as shown by broken lines in FIG. 1B in accordance with the longitudinal vibration because of the elasticity of the flange. The elastic deformation results in a locus 3 shown by a chain line of the flange which slightly expands outward when the flange is elastically deformed as shown by the broken line.

Since the vibration member 2 is ring shaped, the vibration generated in the vibration member 2 includes not only the longitudinal vibration but also a vibrating torsional component as shown by broken lines in FIG. 2. The locus of the vertical vibration generated by the vibration member 2 is slightly inclined inward by the torsional component, as shown by a solid line 4 in FIG. 2. In FIGS. 1B and 2, chain lines 6 show center lines of the ring surface of the ring-shaped vibration member.

Accordingly, in the prior art flange type rotor, the locus of movement of the flange of the rotor does not coincide with the locus of movement of the vibration member by the vibration, and they frictionally contact each other at the contact areas with some slippage therebetween. This slippage is not effectively used as a drive force but it is a loss which prevents the improvement of efficiency.

In the vibration wave motor of a type other than the vibration wave motor having the flange type rotor, if the locus of vibration of the vibration member does not coincide with the locus of displacement of the contact area of the member which frictionally contacts the vibration member, a loss due to a slippage is a serious problem in improving efficiency, as is the case for the flange type rotor.

SUMMARY OF THE INVENTION

It is an object of the present invention to provide a vibration wave motor in which a direction of locus of vibration generated in a vibration member of a vibration wave motor and a direction of locus of displacement of a contact area of a member which frictionally contacts the vibration member at its contact area essentially coincide with each other.

It is another object of the present invention to provide a vibration wave motor which minimizes a loss due to a slippage by increasing the rigidity of the contact area of the movable member which contacts the vibration member without increasing the thickness of the contact area.

Another object of the present invention is to provide a compact vibration wave motor by improving an arrangement relationship between a vibration member and a movable member.

Other objects of the present invention will be apparent from a description of preferred embodiments.

BRIEF DESCRIPTION OF THE DRAWINGS

FIGS. 1A and 1B show sectional views of a prior art flange type rotor,

FIG. 2 is a sectional view which illustrates the vibration of a vibration member, FIG. 4 is a sectional view of a fifth embodiment of the present invention, and FIG. 5 is a perspective view of a rotor having a flange 11 divided in the embodiments shown in FIGS. 3A–3D.

DETAILED DESCRIPTION OF THE PREFERRED EMBODIMENTS

Preferred embodiments of the present invention will be explained with reference to an enlarged sectional view of a portion at which a vibration member 2 and a movable member 1 frictionally contact.

Embodiment 1

Figure 3A:
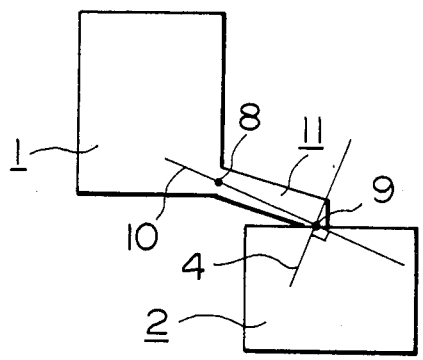
FIGS. 3A–3D are sectional views of first to fourth embodiments of the present invention.

FIG. 3A shows a first embodiment of the present invention. In FIG. 3A, the like elements to those shown in FIGS. 1 and 2 are designated by like numerals.

Numeral 8 denotes a support point of an elastic member of the flange 11 of a ring-shaped rotor 1, numeral 9 denotes a contact area of the flange 11 which contacts a vibration member 2, and numeral 10 denotes a line connecting the contact area 9 and the support point 8. In the present embodiment, the line 10 connecting the contact area 9 and the support point 8 is orthogonal to a locus of vibration generated in the vibration member 2.

(Strictly speaking, the vibration generated in the vibration member 2 is a travelling wave and the locus of vibration travels from a back side or a front side of the drawing to the opposite side. Accordingly, a locus developed when the locus of vibration is projected onto a plane normal to the direction of travel of the travelling wave is orthogonal to the line 10. This is true for all other embodiments.)

Embodiment 2

Figure 3B:
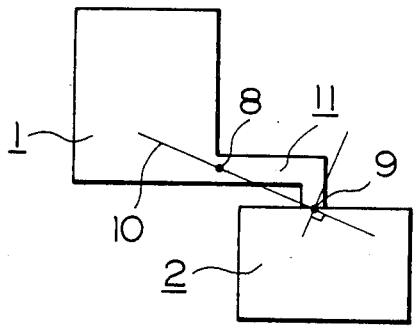

FIG. 3B shows a second embodiment of the present invention. In FIG. 3B, the contact area 9 is thicker than that of the embodiment of FIG. 3A to increase its rigidity.

Embodiment 3

Figure 3C:
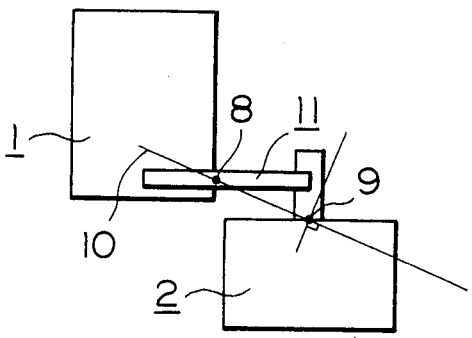

FIG. 3C shows a third embodiment of the present invention. In FIG. 3C, the flange 11 is made of a resilient member such as a leaf spring and it is inserted into the rotor 1 and the contact area 9. In the present embodiment, the contact area 9, and the flange 11 and the rotor 1 are separately formed, and the flange 11 is inserted into the rotor 1 and the contact area 9. When the contact area is to be made of an anti-abrasion material, the entire contact area, flange and rotor should be made of anti-abrasion materials or an end of the contact area 9 should be plated with an anti-abrasion material by plating or sputtering in the embodiments shown in FIGS. 3A and 3B because the contact area, flange and rotor are constructed integrally.

In the present embodiment, the entire contact area 9 may be made of an anti-abrasive material and it may be inserted into the flange 11. When the rotor 1 is made of resin and the flange 11 is inserted therein, the cost of the rotor can be reduced.

Embodiment 4

Figure 3D:
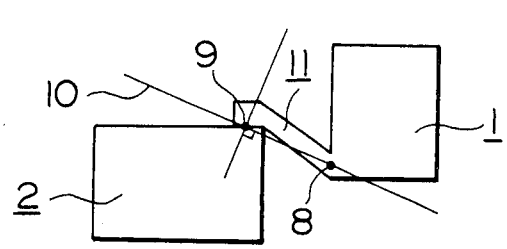

FIG. 3D shows a fourth embodiment of the present embodiment. In the embodiments of FIGS. 3A-3C, the flange 11 extends outwardly of the center line of the ring surface of the vibration member 1. In the present embodiment, the flange extends in the direction of the center line 6, that is, inwardly of the center line, as it does in the prior art apparatus. However, in the present embodiment, it extends obliquely upward, unlike the prior art apparatus in which the flange extends obliquely downward of the vibration member.

Accordingly, the line connecting the support point 8 of the flange 11 and the contact area 9 extends downwardly rightward and is orthogonal to the direction of displacement of the vibration of the vibration member 2 as it does in the other embodiments of the present invention, compared to the line which rises upwardly in the prior art apparatus.

In the present embodiment, the rotor 1 is inside of the vibration member 2 and the flange 11 extends in the direction of the center line, that is, obliquely upward of the direction of the vibration member 2. Accordingly, the outer diameter of the motor can be reduced. Since the flange 11 descends into the vibration member, the thickness of the motor can be reduced compared to the other embodiments for a given rotor thickness.

In the embodiments shown in FIGS. 3A-3D the direction of the vibration generated in the vibration member 2 is orthogonal to the line connecting the contact area 9 of the member (rotor 1) which frictionally contacts the vibration member and the support point 8 of the elastic member of the flange 11. In other words, it indicates that when the contact area 9 moves around the support point 8, the direction of such movement is substantially coincident with the direction of vibration generated in the vibration member. Accordingly, in those embodiments, a loss due to a slippage in the contact surface between the vibration member and the member which frictionally contacts the vibration member is prevented.

In the embodiments shown in FIGS. 3A and 3D, the thickness of the contact area 9 is equal to or thinner than the thickness of the flange. In this structure, a specific vibration frequency of the contact area 9 can be high and an excellent vibration following characteristic is attained. However, since bending rigidity of the contact area 9 is low, the contact area 9 flexes by a pressure of the vibration member 2 and the rotor 1 and the contact area to the vibration member 2 is widened circumferentially to the ring-shaped rotor 1.

Thus, the contact area 9 contacts the area wider than the apex area of the wave generated in the vibration member 2. In such a wide contact area, a component of the mass motion in the direction of drive is at a maximum at the apex generated in the vibration member 2 and becomes smaller as it goes away from the apex and is at a minimum at the midpoint of the apexes, that is, at the bottom of the wave (of the same magnitude but the opposite polarity to that at the apex). Accordingly, the vibration member 2 and the contact area 9 contact in a wide contact area, and since the velocity of the mass point in the contact surface of the vibration members 2 is not uniform in the contact area, a portion of the contact area slips and loss of efficiency is produced.

In the embodiments shown in FIGS. 3B and 3C, the thickness of the contact area 9 is large. Therefore, the bending rigidity of the contact area is improved and the contact in a wide contact area of the contact area 9 and the vibration member 2 as is the case in the embodiments of FIGS. 3A and 3D is prevented, and slippage is prevented to reduce loss of efficiency.

In the embodiment of FIG. 3C, the material of the contact area 9 is the anti-abrasion material. Alternatively, in order to prevent the contact area 9 and the vibration member 2 from contacting in a wide contact area circumferentially of the ring-shaped rotor, the contact area 9 may be made of a material having a high modulus of elasticity relative to that of the flange 11 which is made of a leaf spring so that the bending rigidity is improved in addition to increasing of the contact area 9.

In this case, the material of the contact area 9 may be a light and hard material such as alumina ceramics, and the bending rigidity is improved without deteriorating the vibration tracking characteristic of contact area so that slippage is prevented to reduce loss of efficiency.

The use of the high bending rigidity material for the contact area 9 may be applied to all other embodiments of the present invention.

The use of the high bending rigidity material for the contact area 9 may be applied to other vibration wave motors of the present invention, such as a rotary motor, a linear motor and other motors.

In the embodiment of FIG. 3C, the flange 11 is made of a leaf spring. When the leaf spring is made of phosphor bronze having a good linear spring characteristic or plastic plate having a large vibration attenuation, the function of the spring may be further enhanced.

Embodiment 5

FIG. 4 shows a fifth embodiment of the present invention. In the present embodiment, the rotor 1 frictionally contacts to the vibration member 2 at the contact area 12 through the elastic member 13.

In the present embodiment, since a freedom of deformation of the elastic member 13 is high, a tolerance of an angular error of the surface on which the elastic member 13 is mounted is large.

In the present embodiment, since the direction of vibration of the vibration member 2 is substantially coincident to the direction of displacement of the rotor 1, the slip in the contact area of the vibration member 2 and the rotor 1 can be prevented.

FIG. 5 shows a rotor having the flange 11 of the embodiments shown in FIGS. 3A-3D divided. FIG. 5 shows a sectional view of the rotor in which a portion of the rotor is cut away to clearly show the sectional shape of the rotor.

Since the flange 11 of the rotor is divided, the divided portions of the flange 11 can move independently. Therefore, the vibration generated in the vibration member can be more effectively transmitted to the object.

While the rotary vibration motors have been shown in the embodiments, the present invention can also be applied to a linear vibration wave motor.

As described hereinabove, the direction of the locus of vibration generated in the vibration member is substantially coincident to the direction of locus of the displacement of the object which frictionally contacts the vibration member at the contact area. Accordingly, the loss of efficiency which would be caused in the prior art apparatus by slippage at the contact surface between the object which frictionally contacts the vibration member and the vibration member is prevented and the efficiency of transmission of the vibration is improved.

We claim:

1. A vibration wave motor for generating a travelling wave in a vibration member to drive a movable member by said travelling wave comprising:
    an elastic projection projecting from said moveable member, an edge of said projection contacting said vibration member, said projection being elestically deformed by the vibration of said vibration member under the condition that a supporting point of said projection becomes a fixed point, and said projection contacting said vibration member such that a direction of locus of the elastic deformation of said projection is essentially coincident with a direction of locus of vibration in an area of said movable member in contact with said vibration member.

2. A vibration wave motor for generating a travelling wave in a vibration member to drive a movable member by said travelling wave, comprising:
    a projecting area projecting from said movable member;
    a portion of said projecting area contacting to said vibration member; and
    said projecting area being arranged such that a locus of vibration of said vibration member is substantially orthogonal to a line connecting a support point of said projecting area and the contact area of said vibration member.

3. A vibration wave motor for generating a travelling wave in a vibration member to drive a movable member;
    characterized by that said movable member is of endless shape and has a flange on a circumference thereof,
    one end of said flange contacts to said vibration member, and
    the contact area of said flange is arranged such that a locus of vibration of said vibration member is substantially orthogonal to a line connecting a support point of said flange and said contact area.

4. A vibration wave motor for generating a travelling wave in a vibration member to drive a movable member comprising:
    a projecting area obliquely projecting from said movable member, one end of said projecting area contacting to said vibration member;
    the contact area of said projecting area which contacts to said vibration member being thicker than other portions of said projecting area.

5. A vibration wave motor for generating a travelling wave in a vibration member to drive a movable member comprising:
    a projecting area obliquely projecting from said movable member, one end of said projecting area contacting to said vibration member,
    the contact area of said projecting area which contacts to said vibration member having a higher rigidity than that of other portions of said projecting area.

6. A vibration wave motor for generating a travelling wave in a vibration member to drive a movable member comprising:
    a projecting area projecting from said movable member,
    a contact area on said projecting area to contact to said vibration member,
    said contact area having a higher rigidity than that of other portion of said projecting area.

7. A vibration wave motor for generating a travelling wave in a vibration member to drive a movable member, by said travelling wave;
    wherein said vibration member is of a ring shape, said movable member is of a circular shape and having a circumference smaller than the internal cicumference of said vibration member, said movable member being arranged such that a part of said movable member is inserted into the internal circumference of said vibration member in a thickness direction thereof;
    flange upwardly and angularly projecting from a lower surface of a portion of said movable member which is inserted into the internal circumference of said vibration member, such that an edge portion of said flange contacts with the surface of said vibration member.

8. A vibration wave motor according to claim 1, wherein said projection is composed of two members, one of said two members adapted to form a contact member contacting said vibration member, and said contact member is made of anit-abrasion material.

9. A vibration wave motor according to claim 1, wherein said projection is composed of two members, one of said two members adapted to form a contacting member contacting said vibration member, and said contact member is made of a material of higher rigidity than that of said other member of said projection.

10. A vibration wave motor according to claim 7, wherein said movable member is of a ring shape.

* * * * *

UNITED STATES PATENT AND TRADEMARK OFFICE
CERTIFICATE OF CORRECTION

PATENT NO. : 4,692,650

DATED : September 8, 1987

INVENTOR(S) : ICHIRO OKUMURA ET AL.

It is certified that error appears in the above-identified patent and that said Letters Patent is hereby corrected as shown below:

COLUMN 1:

Line 10, "2. Related Background Art" should read --2. Description of the Prior Art--;
Line 12, "energy," should read --energy transducer,--.

COLUMN 2:

Line 34, delete "a".

COLUMN 4:

Line 14, delete "a";
Line 39, "members" should read --member--;
Line 62, "of contact" should read --of the contact--.

COLUMN 5:

Line 12, delete "to";
Line 20, "to" should read --with--;
Line 21, "the slip" should read --slippage--;
Line 38, "to" should read --with--;
Line 52, "moveable" should read --movable--.

UNITED STATES PATENT AND TRADEMARK OFFICE
CERTIFICATE OF CORRECTION

PATENT NO. : 4,692,650

DATED : September 8, 1987

INVENTOR(S) : ICHIRO OKUMURA ET AL.

It is certified that error appears in the above-identified patent and that said Letters Patent is hereby corrected as shown below:

COLUMN 6:

Line 11, "by" should read --in--;
Line 47, "portion" should read --portions--;
Line 50, "ber, by" should read --ber by--;
Line 60, "flange" should read --a flange--.

Signed and Sealed this

Nineteenth Day of January, 1988

Attest:

DONALD J. QUIGG

*Attesting Officer*    *Commissioner of Patents and Trademarks*